United States Patent [19]

Rösch

[11] Patent Number: 5,388,677
[45] Date of Patent: Feb. 14, 1995

[54] UNIT OF A PISTON AND A PISTON ROD

[75] Inventor: Werner Rösch, Altdorf, Germany

[73] Assignee: Suspa Compart AG, Altdorf, Germany

[21] Appl. No.: 102,796

[22] Filed: Aug. 6, 1993

[30] Foreign Application Priority Data

Aug. 7, 1992 [KR] Rep. of Korea ............... 4226180

[51] Int. Cl.[6] ............................................. F16F 9/00
[52] U.S. Cl. .................... 188/322.22; 29/888.51; 29/507; 29/523; 403/282
[58] Field of Search .................. 188/322.15, 322.16, 188/322.18, 322.22; 29/888.04, 888.051, 525, 507, 512, 522.1, 509, 523; 92/165 R; 403/282, 274, 279

[56] References Cited

U.S. PATENT DOCUMENTS

| | | |
|---|---|---|
| 1,826,544 | 10/1931 | Hervig . |
| 2,455,946 | 12/1948 | Peters et al. ............ 403/282 X |
| 2,685,461 | 8/1954 | Mueller ................... 403/279 X |
| 3,209,437 | 10/1965 | Voorhies . |
| 3,656,593 | 4/1972 | Bauer . |
| 4,877,115 | 10/1989 | Bauer et al. . |
| 5,141,210 | 8/1992 | Bauer et al. . |

FOREIGN PATENT DOCUMENTS

| | | |
|---|---|---|
| 332151 | 1/1921 | Germany . |
| 616115 | 7/1935 | Germany . |
| 2306899 | 8/1974 | Germany .............. 29/888.051 |
| 3425079 | 1/1986 | Germany . |
| 3813021 | 11/1989 | Germany . |
| 4000245 | 2/1991 | Germany . |
| 561134 | 5/1944 | United Kingdom .......... 403/282 |

Primary Examiner—Robert J. Oberleitner
Assistant Examiner—Lee W. Young
Attorney, Agent, or Firm—Browdy and Neimark

[57] ABSTRACT

In a unit of a piston and a piston rod, a piston and a piston rod are connected with each other in a gas-proof manner. To this end, the piston has a closed bottom and a blind hole, into which a sleeve-shaped section of the piston rod is pushed. By means of a force being applied between the piston and the piston rod, the sleeve-shaped section is provided with a bulging which projects into an annular groove of the blind hole. This serves to attain a connection of the piston and the piston rod by form locking.

5 Claims, 1 Drawing Sheet

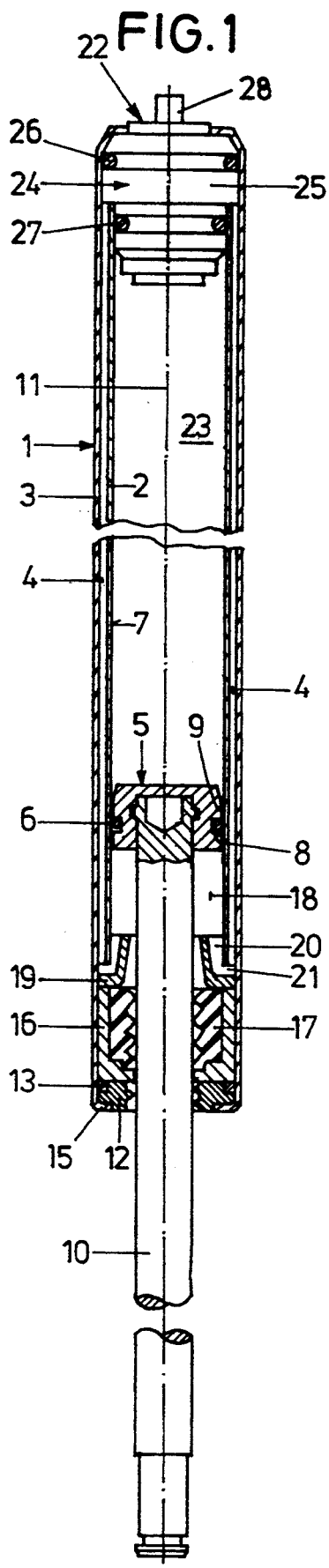
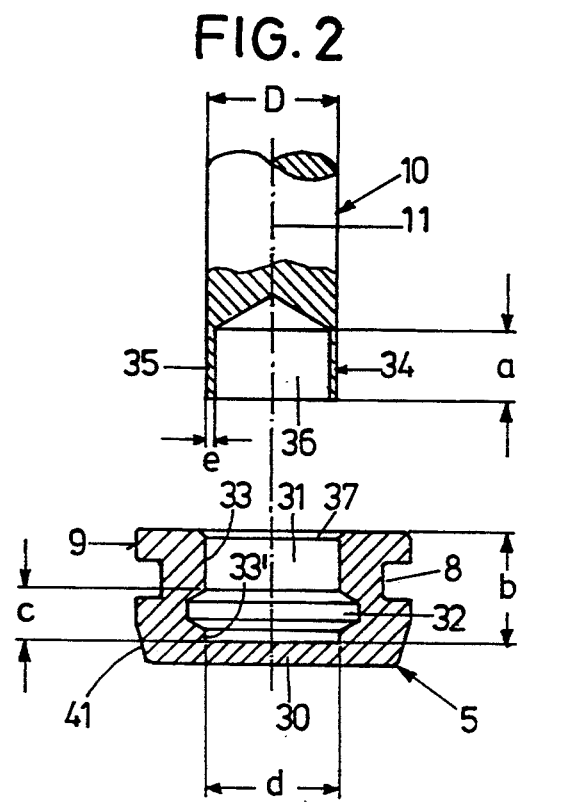
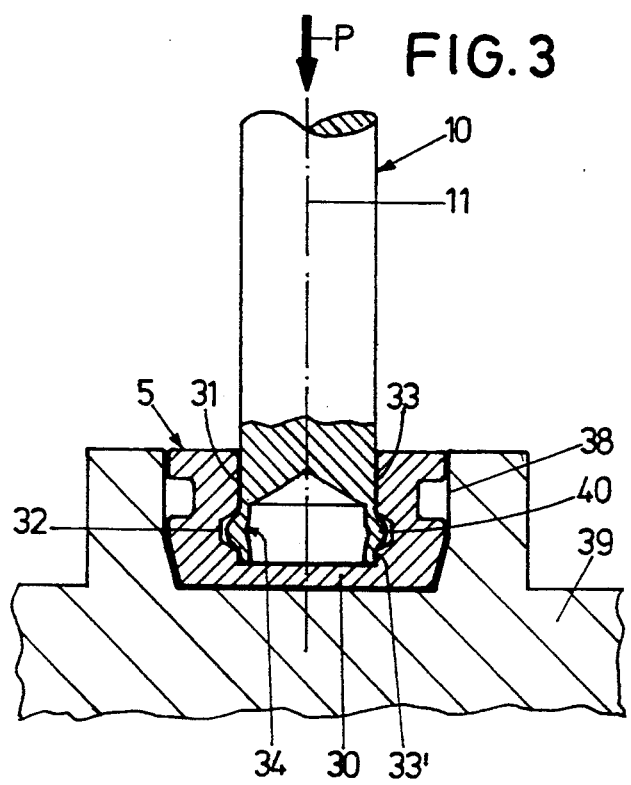

5,388,677

UNIT OF A PISTON AND A PISTON ROD

BACKGROUND OF THE INVENTION

1. Field of the Invention

The invention relates to a unit of a piston and a piston rod of a longitudinally adjustable gas spring, comprising a piston rod, a piston and a gas-proof connection between the piston and the piston rod.

2. Background Art

In longitudinally adjustable gas springs having an actuating valve on the side of the housing opposite to the piston rod exit, the connection between the piston and the piston rod must be gas-proof in order for the two internal chambers separated from each other by the piston in the gas spring to be divided in a gas-proof manner. To this end a sealing is provided between the outside circumferential face and the internal wall of the associated housing. Additional sealings must be provided between the piston rod and the piston, since the piston is formed as an annular disk passed through by a peg-shaped end of the piston rod riveted to the piston rod. This structure is generally known in the longitudinally adjustable gas springs as they are widely spread, for instance from U.S. Pat. No. 3,656,593 or from U.S. Pat. No. 5,141,210. These units imply vast constructional expense; there is no precluding these units from becoming leaky during operation, as a result of which the gas spring concerned becomes unusable.

SUMMARY OF THE INVENTION

It is an object of the invention to embody a unit of a piston and a piston rod of the generic type which combines simplicity of structure with absolute gas-proofness.

In a unit of a piston and a piston rod according to the invention, this object is attained by the piston having a closed bottom and a blind hole open on one side and by the piston rod having, at one of its ends, a sleeve-shaped section arranged in the blind hole of the piston and connected with the piston by form locking. Since the piston is closed over its entire cross-section due to its having a closed bottom, the connection of the piston rod and the piston is absolutely gas-proof. The connection of the piston rod and the piston is also unreleasable and thus reliable, there being form locking between the piston and the piston rod and not only for instance a threaded connection. Of course, such a unit of a piston and a piston rod cannot only be used in longitudinally adjustable gas springs, but for instance also in hydraulic cylinders.

A preferable connection by form locking can be achieved if the blind hole is provided with at least one recess, into which a bulging of the sleeve-shaped section of the piston rod projects or, in particular, if the blind hole is provided with at least one annular groove, into which an annular collar of the sleeve-shaped section projects. If, on either side of the at least one recess, annular cylindrical sections of the blind hole are located of which the inside diameter is about equal to the outside diameter of the sleeve-shaped section of the piston rod, it is ensured that the piston rod takes an exactly centered and oriented position in relation to the piston. If the length of the sleeve-shaped section is smaller than the depth of the blind hole in the piston, and if the length of the sleeve-shaped section of the piston rod is greater than the maximum distance between the bottom and the annular groove, the sleeve-shaped section of the piston rod is entirely accommodated in the blind hole of the piston while, however, overlapping the at least one recess so that it can there be deformed.

Further features, details and advantages of the invention will become apparent from the ensuing description of an example of embodiment taken in conjunction with the drawing.

BRIEF DESCRIPTION OF THE DRAWING

FIG. 1 shows a longitudinally adjustable gas spring with a unit of a piston and a piston rod, FIG. 2 shows a piston and the end of a piston rod to be secured to the latter prior to their being connected with each other, and FIG. 3 shows the production of the connection of the piston and the piston rod.

DESCRIPTION OF THE PREFERRED EMBODIMENT

The longitudinally adjustable gas spring illustrated in FIG. 1 has a housing 1 substantially consisting of two tubes of different diameters one concentrically resting within the other, namely an interior cylinder 2 and an exterior cylinder 3. By reason of the difference in diameter of the interior cylinder 2 and the exterior cylinder 3, an annular chamber 4 forms between the exterior cylinder 3 and the interior cylinder 2.

A piston 5 still to be specified in the following is arranged for axial displacement in the interior cylinder 2 and is sealed towards the internal wall 7 of the interior cylinder 2 by means of a sealing 6 in a gas-proof manner. The O-shaped sealing 6 is located in an annular groove 8 on an outside circumferential face 9 partially cylindrical, of the piston 5. The piston 5 is secured to one end of a piston rod 10 which is displaceably guided coaxially to the common central longitudinal axis 11 of the housing 1 and the piston rod 10. The latter is guided out of one end of the housing 1. At this end the housing 1 is closed by a closing disk 12 which, on its outside circumference, is sealed towards the internal wall 14 of the exterior cylinder 3 by a sealing ring 13 in a gas-proof manner. The closing disk 12 is retained axially outwards by a bead 15 of the exterior cylinder 3. A cup-shaped sleeve 16 bears against the closing disk 12 on the inside, which sleeve 16 accommodates a multiple lip seal 17 with its lips sealingly resting on the piston rod 10. In this way, any exit of gas outwards along the surface of the piston rod 10 is precluded. From the internal chamber 18 of the housing 1 a centering member 19 bears against the sleeve 16, the centering member 19 resting on the internal wall 14 of the exterior cylinder 3 and being provided with ribs 20 on which the interior cylinder 2 is radially supported, i.e. centered, with its internal wall 7. The interior cylinder 2 is also axially firmly supported on these ribs 20, i.e. it is axially unilaterally arrested. Due to the fact that only the ribs 20 are provided for centering and axially supporting the interior cylinder 2, the annular chamber 4 is, in this portion, connected with the internal chamber 18 within the interior cylinder 2, which is defined by the piston 5, the end of the housing 1 on the side of the piston rod exit and the internal wall 7 of the interior cylinder 2. As a result, passage ways 21 are formed between the ribs 20 from the internal chamber 18 to the annular chamber 4.

At the end of the housing 1 opposite to the piston rod exit, a valve 22 is arranged by means of which the internal chamber 23 located in the interior cylinder 2 between the piston 5 and the valve 22 can be connected with or separated from, the annular chamber 4 and thus the other internal chamber 18.

This valve 22 has a valve body 24 provided on its axially central portion with an annular collar 25 which rests against the internal wall 14 of the exterior cylinder 3, whereby the valve body 24 is centered within the exterior cylinder 3. By means of two sealing rings 26, 27 the valve body 24 is sealed off in a gas-proof manner towards the internal wall 14 of the exterior cylinder 3 and the internal wall 7 of the interior cylinder 2, respectively. The valve 22 has an actuating pin 28 guided coaxially to the axis 11 in the valve body 24, by means of which actuating pin 28 being pressed into the valve body 24 the valve opens and the internal chamber 23 can thus be connected with the annular chamber 4 and consequently with the opposite internal chamber 18. In FIG. 1 the actuating pin 28 is shown in a position when the valve 22 is closed. The internal chambers 18, 23 and the annular chamber 4 are filled with compressed gas and a small quantity of oil, the oil serving for lubrication of the piston rod 10 and consequently also for amelioration of the sealing between the piston rod 10 and the seal 17. By means of a bead 29 of the exterior cylinder 3 the valve body 24 of the valve 22 is arrested and safeguarded against being pushed out of the housing 1 in the direction of the axis 11. The longitudinally adjustable gas spring described so far is generally known and widely spread in practice. It is for instance known from U.S. Pat. No. 3,656,593 or from U.S. Pat. No. 5,141,210.

As seen in the figures of the drawing, the piston 5 is a closed body, i.e. it has a closed bottom 30 on its side opposite to the piston rod 10 and facing the internal chamber 23. The piston rod 10 is arranged in a blind hole 31 of the piston 5. The blind hole 31 is cylindrically shaped and, on its portion adjacent to the bottom 30, has an annular groove 32 of about trapezoidal cross-section which tapers from the blind hole radially outwards. Annular cylindrical sections 33, 33' of the blind hole 31 having an inside diameter d are arranged on either side of this annular groove 32. Referred to the annular groove 8 on the outside circumferential face 9 of the piston 5 accommodating the sealing 6, the annular groove 32 is displaced in the direction of the axis 11 towards the bottom 30.

At its end to be connected with the piston 5 the piston rod 10 has a sleeve-shaped section 34 of which the thin, annular cylindrical wall 35 is formed by a blind hole 36 coaxial to the axis 11. The outside diameter D of the sleeve-shaped section 34, which is identical with the diameter of the piston rod 10, is equal to the inside diameter d of the blind hole 31 of the piston 5, so that the sleeve-shaped section 34 can be pushed free from play into the blind hole 31 of the piston 5. The length a of the sleeve-shaped section 34 is smaller than the depth b of the blind hole 31, but greater than the maximum distance c from the bottom 30 and the annular groove 32, so that, the sleeve-shaped section 34 being completely entered into the blind hole 31, the annular groove 32 in the piston 5 is entirely covered by the thin wall 35 of the sleeve-shaped section 34. On the other hand, the solid portion of the piston rod 10 is already in the vicinity of the opening 37 of the blind hole 31. Given a diameter D of the sleeve-shaped section 34 of about 10 mm, the thickness e of the wall 35 of the sleeve-shaped section 34 will be 0.7 to 1 mm as a rule. The piston rod 10 is made of conventional constructional steel. The piston 5 consists of a light metal alloy, usually die-cast aluminium.

To produce the connection between the piston rod 5 and the piston 10, the sleeve-shaped section 34 of the piston rod 10 is pushed into the blind hole 31 of the piston 5 until the wall 35 abuts on the bottom 30 of the piston 5. The piston 5 is retained in an accommodation 38 of a press plate 39 substantially matching in contour.

The piston rod 10 is acted upon by a force P acting in the direction of the axis 11 towards the piston 5 and exercised for instance by a hydraulic press not illustrated. The sleeve-shaped section 34 resting against the bottom 30 of the piston 5 is upset by this force P, its wall bulging into the annular groove 32 of the blind hole 31 of the piston 5. This bulging forms an annular collar 40 projecting outwards from the wall 35 and filling the annular groove 32 at least partially, so that the piston rod 10 and the piston 5 are tightly connected with each other in the direction of the axis 11. The connection of the piston 5 with the piston rod 10 is gas-proof, since the piston 5 has a closed bottom 30, i.e. in the vicinity of the piston rod 10 no compressed gas can get from the internal chamber 18 to the internal chamber 23 in the gas spring specified above and illustrated in FIG. 1. The bottom 30 being closed, there is no necessity of any special sealing measures in the vicinity of the piston rod 10.

In the vicinity of the closed bottom 30, the outside circumferential face 9 of the piston 5 has a tapered section 41 which facilitates the piston 5 to be introduced into the interior cylinder 2 during the assembly of the gas spring and which prevents compressions across the edges to take place between the outside circumferential face 9 and the internal wall 7 of the interior cylinder 2.

What is claimed is:

1. A unit of a piston (5) and a piston rod (10) of a longitudinally adjustable gas spring, comprising a gas-proof connection between the piston (5) and the piston rod (10), wherein the piston (5) has a closed bottom (30) and a blind hole (31) open on one side and wherein the piston rod (10) is solid and has at one of its ends a hollow sleeve-shaped section (34) arranged in the blind hole (31) of the piston (5) and, wherein the blind hole (31) is provided with at least one annular groove (32), into which an annular bulged collar (40) of the sleeve-shaped section (34) projects, which annular bulged collar (40) is formed by upsetting the sleeve-shaped section (34), and wherein the length (a) of the sleeve-shaped section (34) is smaller than the depth (b) of the blind hole (31) in the piston (5).

2. A unit of a piston and a piston rod according to claim 1, wherein on either side of the at least one annular groove (32) annular cylindrical sections (33, 33') of the blind hole (31) are located of which the inside diameter (d) is about equal to the outside diameter (D) of the sleeve-shaped section (34) of the piston rod (10).

3. A unit of a piston and a piston rod according to claim 1, wherein the length (a) of the sleeve-shaped section (34) of the piston rod (10) is greater than the maximum distance (c) between the bottom (30) and the annular groove (32).

4. A unit of a piston and a piston rod according to claim 1, wherein the piston rod (10) is of constructional steel.

5. A unit of a piston and a piston rod according to claim 1, wherein the piston (5) consists of a light metal alloy.

* * * * *